United States Patent Office 3,515,692
Patented June 2, 1970

3,515,692
PROCESS FOR PREPARATION OF ACRYLO-
NITRILE - BUTADIENE - STYRENE GRAFT
COPOLYMERS
Frederick E. Carrock, Paramus, and Kenneth W. Doak, Wyckoff, N.J., assignors to Dart Industries Inc., a corporation of Delaware
No Drawing. Continuation-in-part of application Ser. No. 267,342, Mar. 22, 1963. This application Oct. 24, 1966, Ser. No. 588,769
Int. Cl. C08f 19/18, 45/28; C08d 11/02
U.S. Cl. 260—33.6                                    8 Claims

ABSTRACT OF THE DISCLOSURE

A process for preparing ABS graft copolymers comprises dissolving a linear polybutadiene in a mixture of monomers such as acrylonitrile and styrene, prepolymerizing the resulting solution to convert a portion of the monomers to polymers, adding the prepolymer to an aqueous solution containing hydroxyethyl cellulose as a suspending agent and substantially completely polymerizing the mixture in suspension in the presence of tertiary butyl perbenzoate by gradually increasing the temperature from about 90° C. to 125°–1150° C. The graft copolymer beads recovered from this process have high impact strength and uniform and narrow size distribution.

This application is a continuation-in-part of application Ser. No. 267,342, filed Mar. 22, 1963, now abandoned.

This invention relates to graft copolymers of acrylonitrile, butadiene and styrene and more particularly relates to a process for preparing graft copolymers involving a polybutadiene phase dispersed in a resin phase matrix. Graft copolymers, as used in this specification, include polymer compositions resulting from polymerization of acrylonitrile, butadiene and styrene.

Graft copolymer compositions have heretofore been prepared, according to one method, by techniques involving mixing or blending two or more resinous components. For example, one such combination comprises a blend of butadiene-acrylonitrile elastomeric copolymer with a styrene-acrylonitrile resinous copolymer. Such blends have been noted to be deficient in certain properties, such as hardness and impact strength at low temperatures, as well as heat distortion. According to other methods, it is also known to prepare acrylonitrile-styrene-rubber graft copolymers by emulsion polymerization employing rubber in the latex form, or by agitated bulk prepolymerization of non-linear rubber(s), styrene and acrylonitrile, completed by static bulk polymerization. While various of these other techniques result in graft copolymers possessing certain desired properties, in some instances, such as in the emulsion polymerization technique, the copolymers are contaminated with stabilizers used in the emulsion system, while in others, control of the reaction is complicated by heat transfer conditions. None of these systems yield the graft copolymer in bead form having high impact strength and hardness, which according to recent trends in the industry, is the preferred form.

In accordance with an object of this invention, there is provided an improved process for polymerizing acrylonitrile and styrene with a butadiene wherein uniform sized beads of narrow size distribution are obtained.

A further object of this invention is to prepare acrylonitrile-butadiene-styrene graft copolymer beads by a two-step technique which provides uniform size beads of narrow size distribution.

A still further object of this invention is the provision of a bulk-suspension process for preparing acrylonitrile-butadiene-styrene resins in granular form possessing certain desirable properties as will be noted hereinbelow.

In accordance with this invention, substantially uniform beads of a graft copolymer having a narrow range of bead size and high impact strength are prepared by the steps of dissolving a linear polybutadiene having a cis-1,4 content of between 30 and 98 weight percent in a mixture of monomers of styrene and/or equivalents and acrylonitrile, and prepolymerizing the resulting mixture in bulk to from about 10 to 45% conversion, and preferably from 10 to 30% conversion, subsequently suspending the prepolymer formed in an aqueous suspension and polymerizing the resulting mixture to completion using a catalyst containing t-butyl perbenzoate at certain critical conditions to obtain graft copolymer beads having a high impact strength and a narrow range of bead size.

Graft copolymers prepared from compounds of acrylonitrile and styrene and/or alpha-methylstyrene grafted onto cis-polybutadiene have enhanced physical and chemical properties with respect to toughness at ambient and low temperatures, weather and heat resistance, chemical and solvent resistance and mechanical strength and are useful, therefore, in the preparation of a variety of plastic products by well known plastic processing techniques.

In the prior art processes, such rubbery systems have been used as butadiene-acrylonitrile copolymer (nitrile rubber) containing from 10 to 30% acrylonitrile, polybutadiene rubbers, whether of the linear or non-linear type (emulsion polymerization of butadiene results in a non-linear polymer), polyisoprene, polycyclopentadiene, natural rubber, chlorinated rubber, copolymers of butadiene with styrene, both linear and non-linear, copolymers of butadiene with isobutylene and mixtures thereof. However, according to the process of this invention linear polybutadiene having a cis (polymerized by 1,4 addition) content of about 30 to 98% and preferably 35 to 50% was found to produce the best graft copolymer. The copolymers obtained when this linear polybutadiene is used yield resins of excellent color, gloss and high impact strengths. By excellent color, it is understood that the polymer is relatively free of the yellow color which is usually characteristic of polymers containing acrylonitrile. The cause for the lack of yellowing in these polymers is not understood; however, the use of linear polybutadienes does produce such polymers, which also develop a high surface gloss when molded.

Butadiene (or isoprene) polymerized by cis-1,4 addition exists in a rubbery form at ambient temperatures. This cis-1,4 form can be produced either by lithium metal or lithium alkyls or by a Ziegler type catalyst system, as is well known in the art. These methods of polymerization yield linear polymers in contra-distinction to a largely non-linear polymer obtained by well known emulsion polymerization recipes. The preferred cis-polybutadiene which can be employed in the compositions of this invention will have a viscosity between 20 to 60 as measured on the Mooney viscometer at 212° F. (ML-4).

A critical component of the graft copolymer resins of this invention is acrylonitrile. In the instance of styrene, however, substantial equivalents of this monomer can be incorporated in full or in part in the polymerization system. For example, part of the styrene can be substituted with alpha-methylstyrene, for example up to 50% by weight, to impart certain properties to the polymer, such as improved heat resistance and flow properties. Vinyl aromatics other than styrene can also be used, at least in part, or substituted fully for the styrene monomer, for example those compounds having the aromatic nucleus substituted with one or more groups, such as methyl, ethyl or chloro groups illustrated by such monomers as vinyltoluene, vinylxylene, vinylethyl benzene and vinylchloro benzene or mixtures of these, including minor amounts of alpha-methylstyrene. In the preferred embodiment of this invention, acrylonitrile and styrene are the monomeric components employed, modified as desired with minor amounts of alpha-methylstyrene for the purposes indicated above.

The acrylonitrile can be added to styrene monomer liquid in a ratio from about 20 to 40 parts by weight of the former composition to 80 to 60 parts by weight of the latter composition. Although the monomer components will copolymerize under free radical catalysts in various ratios which are present in the azeotropic composition, i.e. the composition at which the monomer components will enter the copolymer in the same ratio in which the monomers are present in the polymerization mass. For styrene-acryonitrile copolymer, the azeotropic composition is approximately 75 parts styrene to 25 parts acrylonitrile.

In practicing the process of this invention, to styrene and acrylonitrile in a vessel equipped with a stirrer, there is added preferably finely ground monomer-soluble cis-polybutadiene in an amount of from 4-15 weight percent. To the solution of styrene, acrylonitrile and polybutadiene there can also be added antioxidants, chain regulators, lubricants and inert fillers. If desired, as an antioxidant, the conventional alkyl aryl phosphites can be used as well as the phenolic types, for example, trisnonylphenyl phosphite in amounts of from about .01 to 1.0 percent by weight. Mercaptans such as tertiary dodecyl mercaptan, can be added in amounts of from .01 to 0.2 weight percent for the purpose of controlling polymer chain length. Lubricants which can be incorporated in the solution are such as refined mineral oils, paraffin wax or mixtures with mineral oils and hydrocarbon oil or ester lubricants, such as butyl stearate in amounts of from 1 to 4 weight percent. Mineral oil (e.g. white mineral oil) has been found to increase impact values when used in certain specified amounts, for example when used in amounts of at least 2 percent. A preferred mineral oil is one of a saturated aliphatic nature boiling at from 250 to 500° C. and of a centistoke viscosity of from 5 to 100 at 100° F.

The acrylonitrile can be added to the styrene prior to the addition of polybutadiene or after, the addition of this component not being critical at any specific step prior to the prepolymerization reaction.

After the addition of the acrylonitrile to the styrene, and the dissolution of the polybutadiene, polymerization in bulk is commenced using a peroxide catalyst of the oil soluble type or thermally and polymerization is continued at a temperature as follows: for thermal initiation, the temperature can range from 100 to 120° C., preferably 105 to 115° C.; for peroxide initiation, the temperature can range from 60° to 100° C., preferably from 75 to 90° C. The polymerization is continued until from 15 to 30 percent (in the preferred embodiment) of the monomers are polymerized in the mixture. The prepolymerization step generally takes from about 2-4 hours. The use of peroxide catalyst, such as benzoyl peroxide, lauroyl peroxide, tertiary butyl perpenzoate, ditertiary butyl peroxide, etc. is used in amounts of from .05 to 0.2, preferably 0.075 to 0.15 percent by weight based on the mixture.

During the prepolymerization, the components of the system are thoroughly agitated. Agitation is required to properly disperse rubber as it comes out of solution during the prepolymerization step.

Upon completion of the prepolymerization step to the desired conversion, the mixture is suspended in an aqueous system containing stabilizers and polymerization continued to form beads of high impact material. An additional initiator is required in the suspension to substantially complete the polymerization. A single catalyst can be added to the prepolymerization step, followed by the addition of a second catalyst to the suspension step. It is possible, however, to include initially two catalysts in the prepolymerization step, such as a low temperature catalyst for prepolymerization and a high temperature one for the subsequent suspension step. It has been found that superior impact strengths can only be obtained if at least one of the organic peroxides which can be added to the suspension polymerization step is tertiary butyl perbenzoate. Not only does this particular suspension polymerization catalyst shorten the overall polymerization time-temperature cycle, but under certain critical conditions it produces a graft copolymer having the highest impact strength.

The amount of suspension step catalyst used is based on the weight of the prepolymer and the levels used are from about .05 to 0.3 percent by weight when tertiary butyl perbenzoate is used alone, or from 0.1 to 0.4 percent by weight for each when a combination of tertiary butyl perbenzoate and another peroxide is employed for both polymerization steps. Preferred levels are about 0.05 to 0.2 percent by weight for a single catalyst and 0.025 to 0.15 percent by weight for each of the peroxides making up the combination.

The prepolymer, before or after the addition of the suspension step peroxide catalyst is suspended in an aqueous solution containing a suspending agent, and polymerization is continued at time-temperature cycles to be set forth hereinbelow until the monomer is substantially completely polymerized into uniform sized granules or beads. Suspend agents such as carboxymethylcellulose, polyvinyl alcohol, methylcellulose, sulfonated polystyrenes, polyglycol ethers, etc. can be used.

An excellent suspending agent, according to this invention, is a water soluble non-ionic colloid of a high viscosity in an aqueous solution. Hydroxyethyl cellulose has been found, according to this invention, to yield optimum polymerization results. The use of this suspending agent results in non-agglomeration of the polymer beads, minimum water occlusion in the beads and beads having a narrow size distribution. Hydroxyethyl cellulose of a viscosity in a 1% aqueous solution at 25° C. of from 750–10,000 cps. (Brookfield viscometer) is adequate. A preferred viscosity range, however, for a 1% aqueous solution of hydroxyethyl cellulose is from 1500–3500 cps. (Brookfield viscometer) at 25° C. The hydroxyethyl cellulose preferred, according to this invention, is readily available commercially and is soluble in hot or cold water (for further information on the properties of hydroxyethyl cellulose, see H. H. Brownell et al., Canadian Journal of Chemistry, 35, 677 (1957) and S. G. Cohan et al., Journal American Chem. Society, 72, 3954 (1950)).

In preparing the aqueous suspension, the hydroxyethyl cellulose is sifted into the water slowly and with rapid stirring to avoid the formation of agglomerates. If desired, a surface active agent such as sodium dodecylbenzenesulfonate can also be included in the suspension water in an amount of from .001 to .01 weight percent based on the water.

The amount of hydroxyethyl cellulose used is from about .025 to 1.5 weight percent and preferably in an amount of from .075 to 0.25 weight percent based on the water. Any dissolved oxygen or oxygen in the atmosphere immediately above the suspension is displaced by the use of nitrogen.

The prepolymer is added to the suspension, preferably in the vicinity of the agitator blade or vanes so as to facilitate the formation and dispersion of polymer beads. The prepolymer is added in an amount such that the ratio of prepolymer to water is generally from about 1:2 to 5:4, with best results being obtained with a water ratio of 1:1 to 3:4. These prepolymer to water ratios, as can be seen, contribute unique advantages to a process of this type. In prior art techniques using other well known suspending agents, larger amounts of water were required.

The temperature of the suspension is gradually increased from, for example, room temperature or higher, such as 90° C. up to about 135° C., and can, under suitable conditions, be increased up to 150° C. after which period non-agglomerated, uniform sized, high impact, thermoplastic polymer beads of uniform hue are formed in suspension. The time-temperature cycle best suited for completion of the polymerization in suspension after transferring the bulk prepolymer to the aqueous system is generally from 60 to 145° C. for a period of about 4 to 10 hours. Excellent results are obtained with tertiary butyl perbenzoate if the suspension is maintained at a temperature of from 100° to 115° C. for 2 to 4 hours, then 115° to 125° C. for 1 to 2 hours and finally from 125° to 145° C. for 1 to 2 hours.

The substantially completely polymerized beads prepared in accordance with the method herein described are separated from the suspension water by any of the conventional methods, such as screening, sedimentation or centrifuging, dried, extruded, pelletized and packaged.

The following examples further illustrate the invention. The procedure employed in Examples I and II was as follows:

Finely ground, monomer soluble, cis-polybutadiene was dissolved in a monomer blend of styrene and acrylonitrile. The monomer solution was added to a round bottom flask equipped with a condenser and stirrer and while the solution was being agitated, catalyst was added thereto and additives, such as chain transfer agents, antioxidants and lubricants. The flask and its contents were thoroughly flushed with nitrogen and a nitrogen blanket was maintained over the solution. The agitated solution was heated to and maintained at the reflux temperature of acrylonitrile until the monomer was partially polymerized, whereby a prepolymer was prepared. In cases where the prepolymerization temperature was above the boiling point of the monomer mixture, the polymerization was carried out under pressure.

An aqueous suspension bath was prepared by dissolving hydroxyethyl cellulose having a viscosity in a 1% aqueous solution at 25° C. from about 1500 to 2500 cps. (Brookfield viscometer) in a glass bowl pressure reactor equipped with stirrer.

The prepolymer was added to the aqueous suspension bath at a moderate rate while the bath was maintained under constant agitation. The reactor and its contents were flushed with nitrogen and the reactor was sealed and pressurized with 5–20 p.s.i. nitrogen. Polymerization was continued with agitation at a temperature cycle of 3 hours at 115° C., 1 hour at 125° C. and 1 hour at 135° C. Upon completion of the polymerization, the mixture was cooled, the reactor opened and the contents filtered to isolate the beads. The beads were washed with water and dried in a vacuum oven at 65° C. Physical properties of the products from Examples I and II were measured on compression-molded samples.

In all the examples the weight of the rubbery component, mineral oil, trisnonylphenyl phosphite, t-dodecyl mercaptan and initiator was based upon 100 parts by weight of the mixture; the weight of the high temperature catalyst and additional mercaptan (if desired) was based upon 100 parts by weight of the prepolymer; and the weight of hydroxyethyl cellulose in the aqueous suspension bath was based upon the weight of the water.

EXAMPLE I

This example illustrates that linear polybutadienes having medium and high cis-content can be used in accordance with the method described herein to prepare graft copolymers having good physical properties with respect to shock resistance as determined by Izod impact measurements on compression molded samples according to A.S.T.M. Method D–256. It should be noted that injection molded samples usually result in higher impact strengths in ft. lbs./inch of notch. The formulations employed and physical properties are set out in Table I.

TABLE I

| Ingredients | Parts by weight | | | | | |
|---|---|---|---|---|---|---|
| | A | B | C | D | E [1] | F |
| Prepolymerization step: | | | | | | |
| Styrene | 75 | 75 | 75 | 75 | 75 | 60 |
| Acrylonitrile | 25 | 25 | 25 | 25 | 25 | 25 |
| α-Methyl styrene | | | | | | 15 |
| Polybutadiene | 4 [4] | 4 [4] | 4 [8] | 5 [8] | 4 [8] | 4 [8] |
| Benzoyl peroxide | 0.1 | 0.1 | 0.1 | 0.1 | | |
| t-Dodecyl mercaptan | 0.1 | 0.1 | 0.1 | 0.1 | 0.1 | 0.1 |
| Polymerization at ° C | 75–85 | 75–85 | 75–85 | 75–85 | 110 | 120 |
| Total solids, percent | 31.0 | 31.0 | 33.5 | 43.0 | 30.0 | 33.5 |
| Suspension step: | | | | | | |
| Catalyst Addition: t-Butyl perbenzoate | 0.2 | 0.2 | 0.2 | 0.2 | 0.2 | 0.2 |
| Prepolymer | 100 | 100 | 100 | 100 | 100 | 100 |
| Water | 133 | 133 | 100 | 100 | 165 | 165 |
| Hydroxyethyl cellulose | .33 | .33 | .25 | .25 | .25 | .25 |
| t-Dodecyl mercaptan | | | 0.1 | 0.1 | | |
| Physical properties: | | | | | | |
| Izod impact [2] (compression molded) | 1.0 | 1.6 | 2.5 | 3.7 | 4.2 | 2.4 |
| Melt flow [3] at 190° C. (grams/10 minutes) | 0.1 | 0.03 | 0.4 | 0.11 | 0.1 | 1.4 |
| Deflection temperature, ° C. (264 p.s.i.) | | | | | | 95 |

[1] Thermal Prepolymerization.
[2] ASTM D–256–56.
[3] ASTM D–1238–57T.
[4] Linear polybutadiene having 35% cis-1,4 content (Mooney viscosity=55).
[5] Linear polybutadiene having 95% cis-1,4 content (Mooney viscosity about 50).

It was observed that there was no agglomeration during the suspension step and that the compression-molded samples had a high surface gloss and complete absence of yellow color which is usually present when acrylonitrile is incorporated into a polymer. The high prepolymer to water ratios should be noted. Also, the beads were completely dried to a simple vacuum oven at 65° C., thereby indicating that there was substantially no water occluded in them (this would require elaborate high temperature drying apparatus).

EXAMPLE II

This example illustrates that prepolymer-to-water ratios in excess of 1:1 can be used in the method described herein to prepare graft copolymers with no loss in bead color, quality of physical properties. The presence of mineral oil in an amount of about 2% to 4% improved impact values.

TABLE II

| Ingredients | Parts by weight | | | |
|---|---|---|---|---|
| | A | B | C | D |
| Prepolymerization step: | | | | |
| Styrene | 75 | 75 | 75 | 75 |
| Acrylonitrile | 25 | 25 | 25 | 25 |
| Polybutadiene (35% cis-1,4) [1] | 8 | 8 | 8 | 8 |
| Mineral oil | 3 | 3 | 3 | -------- |
| Trisnonylphenyl phosphite | 0.5 | 0.5 | 0.5 | 0.5 |
| Benzoyl peroxide | 0.1 | 0.1 | 0.1 | 0.1 |
| t-Dodecyl mercaptan | 0.2 | 0.2 | 0.2 | 0.2 |
| Polymerization at ° C | 70–80 | 70–80 | 70–80 | 79–85 |
| Total solids, percent | 36.4 | 36.4 | 36.4 | 46.0 |
| Suspension step: | | | | |
| Catalyst addition: t-Butyl perbenzoate | 0.2 | 0.2 | 0.2 | 0.2 |
| Prepolymer | 100 | 100 | 100 | 100 |
| Water | 133 | 100 | 80 | 100 |
| Hydroxyethyl cellulose | 0.25 | 0.19 | 0.14 | 0.25 |
| t-Dodecyl mercaptan | 0.1 | 0.1 | 0.1 | -------- |
| Physical properties: | | | | |
| Bead size | Med. | Large | Large | Med. |
| Izod impact [2] (compression molded) | 3.0 | 2.9 | 2.9 | 1.6 |
| Melt flow [3] at 190° C. (grams/10 minutes) | 0.2 | 0.3 | 0.5 | 0.1 |

[1] Mooney viscosity=55.
[2] ASTM D-256-56.
[3] ASTM D-1238-57T.

The data set forth in Table II clearly demonstrates the effectiveness of hydroxyethyl cellulose as a suspending agent, in that graft copolymers having high impact strength and excellent color are prepared from a prepolymer-to-water ratio of 5:4. It will also be noted from the data contained in Table II that the presence of mineral oil in the formulation substantially improves the impact strength of the graft copolymer.

EXAMPLE III

This example illustrates the advantages of using a catalyst containing t-butyl perbenzoate in the suspension step of the process of this invention over a catalyst containing only di-t-butyl peroxide. The same general procedure was used in Example III as was used in Examples I and II. However, some variations were made in the prepolymerization and suspension steps. A second addition of the mercaptan chain transfer agents was made during the prepolymerization step at 105° C. after the total solids content had reached about 22 to 24%. The suspension step was carried out at a temperature cycle of 3 hours at 105° C., 1 hour at 115° C., 1 hour at 130° C. and 1½ hours at 145° C. Table III sets forth the other operating conditions and details of Example III including the formations employed and the physical properties obtained.

TABLE III

| Ingredients | Parts by weight | | | |
|---|---|---|---|---|
| | A | B | C | D |
| Prepolymerization step: | | | | |
| Styrene | 75 | 75 | 75 | 75 |
| Acrylonitrile | 25 | 25 | 25 | 25 |
| Polybutadiene [1] | 10 | 10 | 10 | 10 |
| Mineral oil | 1.5 | 1.5 | 1.5 | 1.5 |
| Trisnonylphenyl phosphite | 0.25 | 0.25 | 0.25 | 0.25 |
| t-Dodecyl mercaptan (1st addition) | 0.1 | 0.1 | 0.1 | 0.1 |
| t-Dodecyl mercaptan (2nd addition) | 0.2 | 0.2 | 0.2 | 0.2 |
| n-Dodecyl mercaptan | 0.1 | 0.1 | 0.1 | 0.1 |
| Polymerization at ° C | 105 | 105 | 105 | 105 |
| Total solids, percent | 32.0 | 32.0 | 32.0 | 32.0 |
| Suspension step: | | | | |
| Catalyst addition: | | | | |
| t-Butyl perbenzoate | 0.15 | 0.15 | 0.15 | -------- |
| Di-t-butyl peroxide | 0.05 | 0.05 | 0.05 | 0.05 |
| Prepolymer | 100 | 100 | 100 | 100 |
| Water | 100 | 100 | 100 | 100 |
| Hydroxyethyl cellulose | 0.25 | 0.25 | 0.25 | 0.25 |
| t-Dodecyl mercaptan | | | | |
| Physical properties: | | | | |
| Izod impact [2] Compression molded | | | 0.7 | 0.3 |
| Injection molded | 4.7 | 3.7 | 2.5 | 0.4 |
| Melt flow [3] (grams/10 minutes): | | | | |
| At 190° C | | | 1.9 | 5.8 |
| At 230° C | 11.3 | 9.6 | 8.4 | 38.4 |

[1] Linear polybutadiene having 35% cis-1,4 content (Mooney viscosity=35).
[2] ASTM D-256-56.
[3] ASTM D-1238-57T.

The data set forth in Table III demonstrates that a product having a much higher impact strength was obtained when using a catalyst containing t-butyl perbenzoate than when using di-t-butyl peroxide alone under the same conditions. A portion of the same prepolymerization solution used in the suspension step of Run C was used in Run D to further eliminate introducing any new variables into the prepolymerization step.

EXAMPLE IV

This example further illustrates the advantages of using a catalyst containing t-butyl perbenzoate in the suspension step of the process of this invention over a catalyst containing di-t-butyl peroxide alone by comparing the Izod impact strengths of products having the same melt flow characteristics.

The data used to make this comparison was obtained from pilot plant runs using the following procedure:

Cis-polybutadiene was chopped into small pieces and added to a monomer blend of styrene and acrylonitrile in a dissolving vessel. The mineral oil and antioxidant were then introduced into the dissolving vessel and the mixture was completely dissolved. The vessel was alternatively purged with nitrogen and evacuated under reduced pressure to remove dissolved air. The solution was pumped through a filter to a prepolymerization vessel to eliminate external contaminants and any undissolved polybutadiene particles. The solution was heated to about 90° C., the mercaptan chain transfer agents were added and the solution was then heated to polymerization temperatures. The prepolymerization was continued with agitation until about 20 to 30% of the monomers had been polymerized.

An aqueous solution of hydroxyethyl cellulose was prepared prior to the suspension step and added to the suspension vessel. The prepolymerization solution was then transferred to the suspension vessel at prepolymerization temperatures. After this transfer, the temperature of the suspension was no greater than 90° C. The catalyst was then added to the suspension with agitation. At this point, additional mineral oil and/or mercaptan were added in some of the runs. The temperature of the suspension was brought to polymerization temperatures and the runs were carried out at one of the following temperature cycles:

system with the products from the di-t-butyl peroxide catalyst which have the same melt flow characteristics.

| Temperature cycle | | | | | | |
|---|---|---|---|---|---|---|
| A | B | B' | B'' | C | D | E |
| Temp., hr. at °C. | Temp., hr. at °C. | Temp., hr. at °C. | Temp., hr. at °C. | Temp., hr. at °C. | Temp., hr. at °C. | Temp., hr. at °C. |
| 2   120 | 3   105 | 3       110-115 | 3   120 | 3       110-115 | 4   105-110 | 5   110 |
| 1½  130 | 1½  125 | 1-1½    125     | 1½  135 | 1-1½    120-125 | 1   125     | 1   125 |
| 1   135 | 2   140 | 1-3     130-140 | 2   140 | 1-1½    130-135 | 4   135     | 3   135 |
| 2   140 |         |                 |         | 1½      140     |             |         |

Tables IV and V indicate the specific operating conditions of each run, the physical properties of injected molded samples of the resulting products and other details of Example IV. All the runs of Table IV were operated with a high level of antioxidant (0.5 part of trisnonylphenyl phosphite) and all the runs of Table V were operated with a low level of antioxidant (0.25 part of trisnonylphenyl phosphite).

For example, the results obtained in Run 16 using t-butyl perbenzoate alone can be compared with the results of Run 21 using di-t-butyl peroxide alone, both runs of Table V. One will note that the Izod impact strength for the product of Run 16 is over 3 times higher than the Izod strength of the product of Run 21 for the same melt flow. The only significant difference between these two runs, other than the catalyst used in the suspension

TABLE IV

| Ingredients | 1 | 2 | 3 | 4 | 5 | 6 | 7 | 8 | 9 | 10 | 11 | 12 |
|---|---|---|---|---|---|---|---|---|---|---|---|---|
| Prepolymerization Step:[1] | | | | | | | | | | | | |
| Styrene | 75 | 75 | 75 | 75 | 75 | 75 | 75 | 75 | 75 | 75 | 75 | 75 |
| Acrylonitrile | 25 | 25 | 25 | 25 | 25 | 25 | 25 | 25 | 25 | 25 | 25 | 25 |
| Polybutadiene (35% cis-1,4)[2] | 8 | 8 | 8 | 8 | 8 | 8 | 8 | 8 | 8 | 8 | 8 | 8 |
| Mineral oil | 3.0 | 3.0 | | 0.5 | 2.0 | | | | | | 1.0 | 2.0 |
| Trisnonylphenyl phosphite | 0.5 | 0.5 | 0.5 | 0.5 | 0.5 | 0.5 | 0.5 | 0.5 | 0.5 | 0.5 | 0.5 | 0.5 |
| t-Dodecyl mercaptan | 0.1 | 0.1 | 0.1 | 0.1 | 0.1 | 0.1 | 0.1 | 0.1 | 0.1 | 0.1 | 0.05 | 0.1 |
| Polymerization at ° C | 105 | 105 | 105 | 105 | 105 | 105 | 105 | 105 | 105 | 105 | 105 | 105 |
| Total solids, percent | 27.0 | 27.0 | 29.0 | 26.0 | 29.0 | 30.0 | 25.0 | 26.0 | 23.0 | 24.0 | 28.0 | 27.0 |
| Suspension step: | | | | | | | | | | | | |
| Catalyst Addition: | | | | | | | | | | | | |
| t-Butyl perbenzoate | 0.1 | 0.1 | 0.1 | 0.15 | 0.1 | 0.1 | | | | | | |
| Di-t-butyl peroxide | | | | | 0.05 | 0.05 | 0.1 | 0.1 | 0.1 | 0.1 | 0.1 | 0.1 |
| Mineral oil (additional) | | | 1.0 | | | 2.0 | 1.0 | 1.0 | 0.5 | 0.75 | | |
| Prepolymer | 100 | 100 | 100 | 100 | 100 | 100 | 100 | 100 | 100 | 100 | 100 | 100 |
| Water | 133 | 133 | 133 | 133 | 133 | 133 | 133 | 133 | 133 | 133 | 133 | 133 |
| Hydroxyethyl cellulose | 0.2 | 0.2 | 0.25 | 0.2 | 0.25 | 0.3 | 0.3 | 0.3 | 0.3 | 0.3 | 0.25 | 0.25 |
| t-Dodecyl mercaptan | | | | | 0.1 | | | | | | | |
| Temperature cycle | B' | B' | E | B' | D | D | A | A | A | A | B'' | A |
| Physical properties: | | | | | | | | | | | | |
| Izod impact[3] (Inj. molded) | 5.8 | 5.2 | 8.0 | 8.1 | 5.2 | 5.6 | 1.7 | 1.5 | 1.6 | 1.5 | 2.9 | 2.4 |
| Melt flow[4] at 230° C. (grams/10 minutes) | 1.1 | 0.5 | 1.3 | 0.13 | 0.6 | 0.9 | 3.4 | 4.0 | 3.3 | 3.4 | 1.7 | 3.6 |
| Deflection temperature, ° C. (264 p.s.i.) | | | | 92 | | 87 | 90 | 90 | | | 100 | |

[1] Thermal Prepolymerization.
[2] Mooney Viscosity=55.
[3] ASTM D-256-56.
[4] ASTM D-1238-57T.

TABLE V

| Ingredients | 13 | 14 | 15 | 16 | 17 | 18 | 19 | 20 | 21 | 22 | 23 | 24 |
|---|---|---|---|---|---|---|---|---|---|---|---|---|
| Prepolymerization step:[1] | | | | | | | | | | | | |
| Styrene | 75 | 75 | 75 | 75 | 75 | 75 | 75 | 75 | 75 | 75 | 75 | 75 |
| Acrylonitrile | 25 | 25 | 25 | 25 | 25 | 25 | 25 | 25 | 25 | 25 | 25 | 25 |
| Polybutadiene (35% cis-1,4)[2] | 8 | 8 | 8 | 8 | 8 | 8 | 8 | 8 | 8 | 8 | 8 | 8 |
| Mineral oil | 1.0 | 1.0 | 1.0 | 1.0 | 1.0 | 1.0 | 1.0 | 1.0 | 1.0 | 1.0 | 1.0 | 0.5 |
| Trisnonylphenyl phosphite | 0.25 | 0.25 | 0.25 | 0.25 | 0.25 | 0.25 | 0.25 | 0.25 | 0.25 | 0.25 | 0.25 | 0.25 |
| t-Dodecyl mercaptan | 0.1 | 0.1 | 0.1 | 0.1 | 0.1 | 0.1 | 0.05 | 0.05 | 0.05 | 0.05 | 0.1 | 0.1 |
| Polymerization at ° C | 105 | 105 | 105 | 105 | 105 | 105 | 105 | 105 | 105 | 105 | 105 | 103 |
| Total solids, percent | 26.0 | 26.0 | 26.0 | 27.0 | 28.0 | 28.0 | 25.0 | 25.0 | 25.0 | 25.0 | 27.0 | 24.0 |
| Suspension step: | | | | | | | | | | | | |
| Catalyst addition: | | | | | | | | | | | | |
| t-Butyl perbenzoate | 0.15 | 0.15 | 0.15 | 0.15 | 0.15 | 0.15 | | | | | | |
| Di-t-butyl peroxide | | | | | | 0.05 | 0.1 | 0.1 | 0.1 | 0.1 | 0.1 | 0.1 |
| Mineral oil (additional) | | | | | | | | | | | | |
| Prepolymer | 100 | 100 | 100 | 100 | 100 | 100 | 100 | 100 | 100 | 100 | 100 | 100 |
| Water | 133 | 133 | 133 | 133 | 133 | 133 | 133 | 133 | 133 | 133 | 133 | 133 |
| Hydroxyethyl cellulose | 0.25 | 0.25 | 0.25 | 0.3 | 0.3 | 0.3 | 0.3 | 0.3 | 0.3 | 0.35 | 0.3 | 0.25 |
| t-Dodecyl mercaptan | | 0.05 | 0.1 | 0.1 | 0.1 | 0.1 | | | | | | |
| Temperature cycle | B | B | B | B | B | B | C | C | C | C | C | C |
| Physical properties: | | | | | | | | | | | | |
| Izod impact[3] (Inj. molded) | 7.6 | 6.7 | 7.8 | 6.3 | 6.5 | 5.8 | 2.3 | 1.7 | 2.5 | 2.4 | 1.4 | 3.3 |
| Melt flow[4] at 230° C. (grams/10 minutes) | 0.17 | 0.24 | 0.8 | 1.5 | 1.2 | 0.93 | 0.95 | 0.86 | 1.5 | 0.9 | 7.8 | 1.9 |
| Deflection temperature, ° C. (264 p.s.i.) | 90 | 88 | 76 | 69 | 75 | 93 | | | | | | 86 |

[1] Thermal Prepolymerization.
[2] Mooney Viscosity=55.
[3] ASTM D-256-56.
[4] ASTM D-1238-57T.

The data set forth in Tables IV and V clearly demonstrate that the product obtained when using a catalyst containing t-butyl perbenzoate in the suspension step had a higher impact strength than when using di-t-butyl peroxide alone. This is particularly evident when one compares the products from the t-butyl perbenzoate catalyst step, is that half the amount of mercaptan was used in Run 21 than was used in Run 16. This kept the melt flow of the Run 21 product exactly the same as that of the Run 16 product. The results of Run 16 can also be compared with those of Run 11 of Table IV and Run 24 of Table V. The results indicate that a much smaller Izod impact strength for approximately the same melt flow was obtained when using di-t-butyl peroxide than when using t-butyl perbenzoate.

Other runs in which a similar comparison can be made include Run 18 of Table V and Run 6 of Table IV, both using a dual catalyst comprising tertiary butyl perbenzoate and di-t-butyl peroxide, compared with Runs 19 and 22 of Table V using di-t-butyl peroxide alone, and Run 15 of Table V using tertiary butyl perbenzoate alone compared with Run 20 of Table V using di-t-butyl peroxide alone. It will also be noted from the data contained in Table IV and Table V that the highest Izod impact strength for any of the products obtained when using di-t-butyl peroxide catalyst alone in the suspension step under the most favorable conditions is 3.3 ft.-lb./inch of notch. This value is less than half the highest Izod impact strength obtained from using a catalyst system which includes t-butyl perbenzoate.

The foregoing examples illustrate the process of this invention and various embodiments thereof. There is thus illustrated the use of high prepolymer to water ratios which is a unique advantage of this process. This aspect enables high capacity and efficiency in commercial production. It also means less costly equipment for handling large amounts of water as would be required where, for example, prepolymer to water ratios of 1:5 were employed.

The minimum amount of water occluded in the polymer beads is a further unique advantage of this process. For example, in laboratory work it was found that the polymer could be easily dried at low temperatures under vacuum or circulating air ovens, since all the water is surface adhered. If water were occluded in the polymer, expensive drying equipment would be needed to completely dry the beads. The beads prepared by the process of this invention contained only surface water, as evidenced by complete drying in simple low temperature ovens.

A still further advantage of the process of this invention is the ability to use various temperatures during suspension polymerization, for example, temperature higher than 115° C. This versatility permits better control of time-temperature cycles and properties of the polymer.

In bulk-suspension polymerization reactions in accordance with this process, it was found that uniform beads of 20 to 25 mesh can be produced. All formulations above gave high impact graft copolymers. For masterbatch preparation, higher impact material can be obtained depending on the amount of polybutadiene used in the formulations.

Modifications falling within the scope of this invention can be made without departing from the scope of the appended claims.

What is claimed:

1. In a process for preparing an acrylonitrile-butadiene-styrene graft copolymer by dissolving a linear polybutadiene having a cis-1,4 content of between 30 and 98 weight percent in a mixture of monomers comprising 20 to 40 weight percent acrylonitrile and 80 to 60 weight percent styrene, prepolymerizing the resulting solution with continuous agitation in the presence of a mercaptan chain regulator to convert 10 to 45 percent of the monomers to polymers, and substantially completely polymerizing the prepolymer in a subsequent polymerization step, the improvement which consists essentially of the steps of:
    (a) adding the prepolymer to an aqueous system in a prepolymer to water ratio of from 1:2 to 5:4, said system containing hydroxyethyl cellulose as a suspending agent in an amount of from 0.025 to 1.5 percent based on the weight of water.
    (b) substantially completely polymerizing the mixture of step (a) in the presence of tertiary butyl perbenzoate by gradually increasing the temperature from about 90° C. to a temperature in the range of 125° to 150 C., and
    (c) recovering graft copolymer beads having a high impact strength and a substantially uniform and narrow size distribution.

2. The process of claim 1 wherein the hydroxyethyl cellulose used as the suspending agent in step (a) has a viscosity in a 1 percent aqueous solution of from 1500 to 3500 cps. at 25° C. as measured on a Brookfield viscometer.

3. The process of claim 1 wherein the catalyst also contains an organic peroxide selected from the group consisting of dibenzoyl peroxide, dicaproyl peroxide, dilauroyl peroxide, ditertiary butyl peroxide and mixtures thereof.

4. The acrylonitrile-butadiene-styrene graft copolymer composition obtained by the processes of claim 1 wherein said linear polybutadiene has a viscosity of between 20 to 60 as measured on a Mooney viscometer at 212° F. (ML-4) and ranges in amounts from about 4 to 15 parts by weight, said acrylonitrile ranges in amounts from about 20 to 40 parts by weight and said styrene ranges in amounts from about 60 to 80 parts by weight.

5. The composition of claim 4 wherein a minor amount of said styrene is replaced with alpha-methyl styrene.

6. The composition of claim 4 wherein from 2 to 4 weight percent of mineral oil is included therein to improve the impact strength of the graft copolymer.

7. A process for preparing an acrylonitrile-butadiene-styrene graft copolymer comprising the steps of:
    (a) dissolving a linear polybutadiene having a cis-1,4 content of between 35 and 50 weight percent in a mixture of monomers comprising 20 to 40 weight percent acrylonitrile and 80 to 60 weight percent styrene,
    (b) prepolymerizing the resulting solution with continuous agitation in the presence of a mercaptan chain regulator by thermal initiation at an elevated temperature in the range of about 100° to 120° C. to convert 15 to 30 percent of the monomers to polymers,
    (c) adding the prepolymer at said elevated temperature to an aqueous system in a prepolymer to water ratio of from 1:2 to 1:1, said system containing hydroxyethyl cellulose as a suspending agent in an amount of from 0.025 to 1.5 percent based on the weight of water,
    (d) adding an organic peroxide catalyst to the resulting suspension at a temperature no greater than 90 C., wherein at least a major portion of the catalyst is tertiary butyl perbenzoate,
    (e) substantially completely polymerizing said suspension by gradually increasing the temperature from about 90° C. to a temperature within the range of 125° to 150° C., and,
    (f) recovering graft copolymer beads having a high impact strength and a substantially uniform and narrow size distribution.

8. A process of claim 7 wherein the catalyst also contains a minor portion of ditertiary butyl peroxide.

References Cited
UNITED STATES PATENTS

| | | | |
|---|---|---|---|
| 2,862,907 | 12/1958 | Stein et al. | 260—880 |
| 3,243,481 | 3/1966 | Ruffing et al. | 260—880 |
| 3,278,642 | 10/1966 | Lieng-Huang Lee | 260—880 |

ALLAN LIEBERMAN, Primary Examiner

U.S. Cl. X.R.

260—17, 29.7, 880